US008456363B2

(12) United States Patent
Konishi et al.

(10) Patent No.: US 8,456,363 B2
(45) Date of Patent: Jun. 4, 2013

(54) POSITION DETECTION DEVICE, POSITION DETECTION METHOD AND POSITION DETECTION PROGRAM

(75) Inventors: Yuusuke Konishi, Tokyo (JP); Toshiyasu Nakao, Tokyo (JP)

(73) Assignee: NEC Corporation, Tokyo (JP)

( * ) Notice: Subject to any disclaimer, the term of this patent is extended or adjusted under 35 U.S.C. 154(b) by 258 days.

(21) Appl. No.: 12/863,937

(22) PCT Filed: Jan. 26, 2009

(86) PCT No.: PCT/JP2009/051190
§ 371 (c)(1),
(2), (4) Date: Jul. 21, 2010

(87) PCT Pub. No.: WO2009/096358
PCT Pub. Date: Aug. 6, 2009

(65) Prior Publication Data
US 2010/0291879 A1    Nov. 18, 2010

(30) Foreign Application Priority Data
Jan. 31, 2008    (JP) ................ 2008-021623

(51) Int. Cl.
*G01S 3/02*    (2006.01)
*G01S 5/02*    (2010.01)

(52) U.S. Cl.
CPC .................... *G01S 5/0252* (2013.01)
USPC ........................... 342/451; 342/464

(58) Field of Classification Search
CPC .................................... G01S 5/0252
USPC ...... 342/451, 463–465, 386–387; 455/115.1, 455/115.3, 456.1
See application file for complete search history.

(56) References Cited

U.S. PATENT DOCUMENTS
7,627,329 B2 * 12/2009 Mizugaki et al. .......... 455/456.1

FOREIGN PATENT DOCUMENTS
JP    2006308361 A    11/2006
JP    2006329688 A    12/2006

OTHER PUBLICATIONS
International Search Report for PCT/JP2009/051190 mailed Mar. 17, 2009.
(Continued)

*Primary Examiner* — Gregory C Issing
*Assistant Examiner* — Nga X Nguyen

(57) ABSTRACT

The position detection device for detecting a position of a moving body in a predetermined environment, which includes a reception feature quantity generation unit 41 which obtains, from a base station which is disposed in the environment and receives identification information transmitted by radio communication from a mobile station attached to the moving body and a reference station disposed in each area defined in advance in the environment, the identification information and a reception intensity as of the reception of the identification information to generate a reception feature quantity which correlates the reception intensity related to each of the mobile station and the reference station with the base station, a position reception feature quantity generation unit 43 which generates a reception feature quantity of each area from the reception feature quantity related to the reference station taking into consideration a factor of a difference caused between generated reception feature quantities related to the mobile station and the reference station, a position reception feature quantity storage unit 45 which learns a generated reception feature quantity of each area and records the quantity together with position identification information, and a position determination unit 46 which searches the position reception feature quantity storage unit for a reception feature quantity most proximate to the generated reception feature quantity related to the mobile station and outputs corresponding position identification information as a position detection result.

15 Claims, 9 Drawing Sheets

OTHER PUBLICATIONS

G. Chen et al., "A Survey of Context-Aware Mobile Computing Research", Dartmouth Computer Science Technical Report TR2000-381, 2000, pp. 1-16.

Lionel M. Ni et al., "LANDMARC: Indoor Location Sensing Using Active RFID", Proceedings of the First IEEE international Conference on Pervasive Computing and Communications (PerCom'03), 2003, pp. 1-9.

T. Kohonen, "Self-Organizing Maps" Springer-Verlag Tokyo Co.Ltd., Jun. 2005, pp. 100-121, 250-261.

* cited by examiner

FIG. 3

| IDENTIFICATION INFORMATION OF BASE STATION | RECEPTION INTENSITY |
|---|---|
| BASE STATION 3a | 165 |
| BASE STATION 3b | 0 |
| BASE STATION 3c | 204 |
| BASE STATION 3d | 129 |
| : | : |

FIG. 4

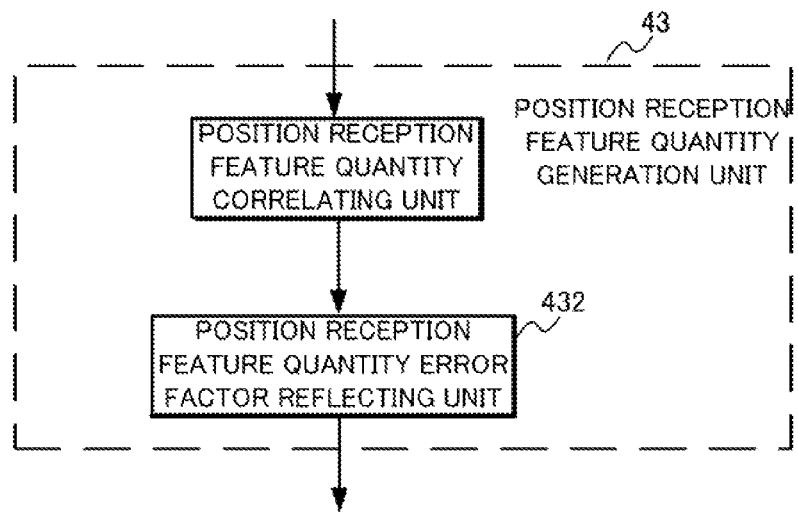

FIG. 5

| POSITION IDENTIFICATION INFORMATION | RECEPTION FEATURE QUANTITY |
|---|---|
| AREA A | RECEPTION FEATURE QUANTITY 1 |
| AREA A | RECEPTION FEATURE QUANTITY 2 |
| AREA A | RECEPTION FEATURE QUANTITY 3 |
| AREA A | RECEPTION FEATURE QUANTITY 4 |
| AREA B | RECEPTION FEATURE QUANTITY 5 |
| : | : |

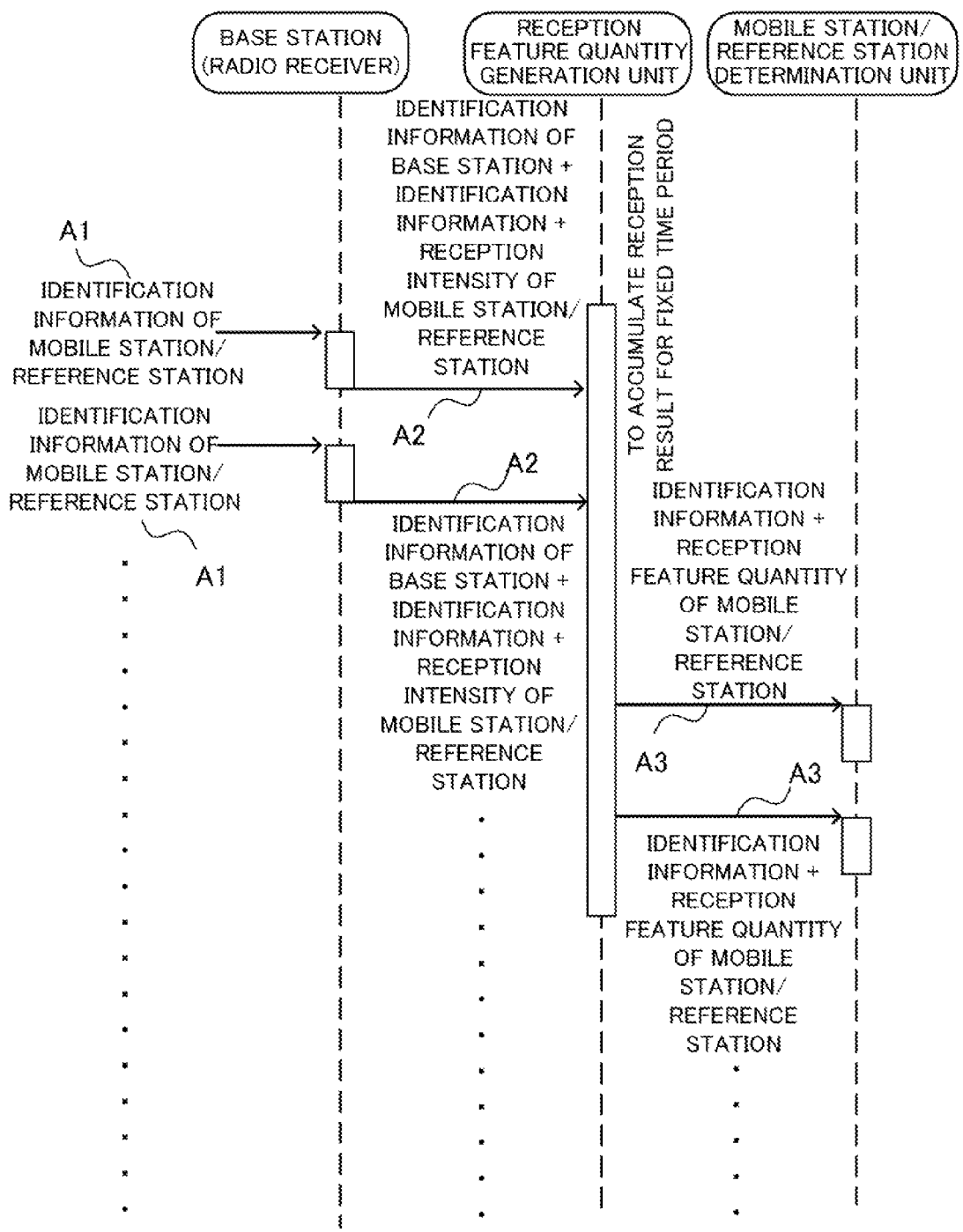

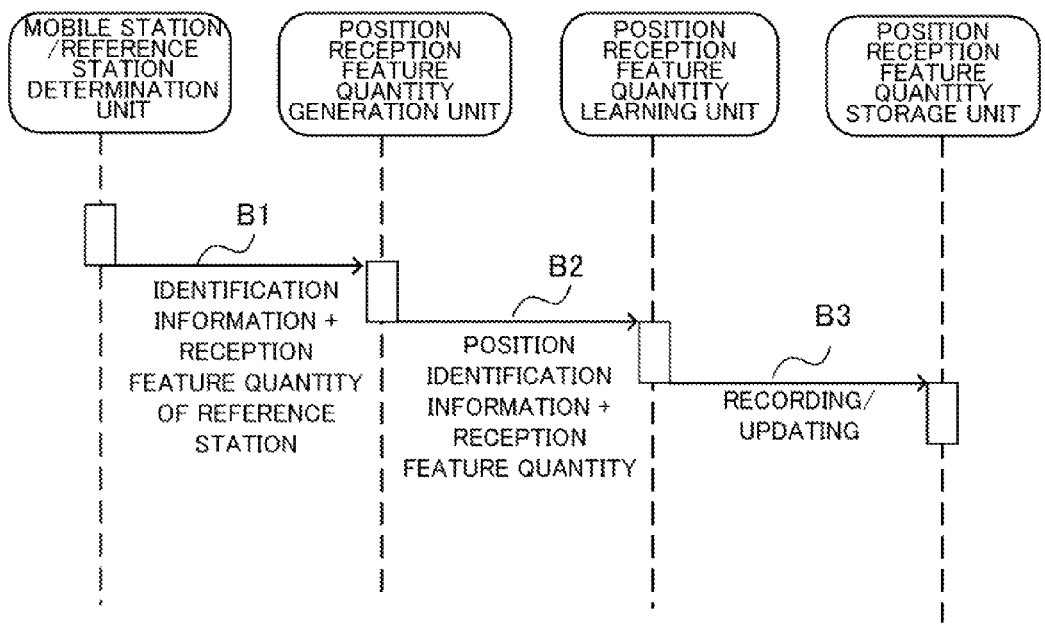
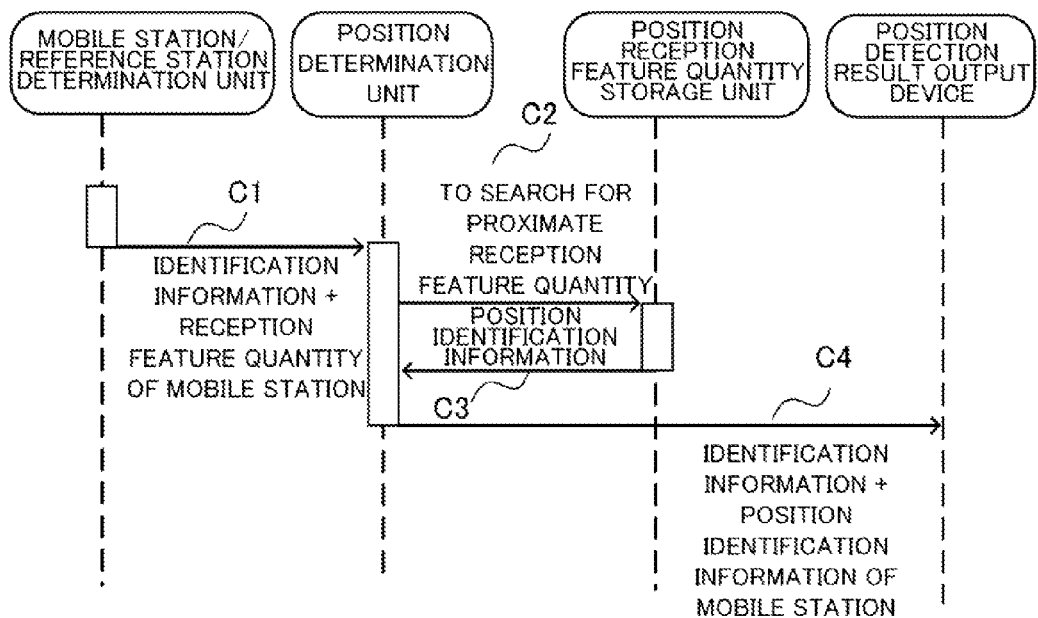

POSITION DETECTION DEVICE, POSITION DETECTION METHOD AND POSITION DETECTION PROGRAM

TECHNICAL FIELD

The present invention relates to a system which detects a position of a moving body by using a radio machine and, more particularly, a position detection device, a position detection method and a position detection program which enable an area where a radio machine attached to a moving body exists to be detected with high precision by using a radio machine for reference which is disposed in an environment.

BACKGROUND ART

Proposed as a system which detects a position of a terminal or the like attached to a moving body such as a person or an object is a system which uses GPS, radio LAN, RFID, infrared, ultrasonic or the like. Recited in Non-Patent Literature 1, for example, is the system which detects a position of a terminal attached to a moving body by using various kinds of media such as radio, ultrasonic and infrared.

Proposed is a technique for using, in a system using a radio machine such as radio LAN or RFID among such position detection systems, a radio machine for reference which is disposed in an environment and has the same function as that of a device attached to a moving body in order to increase precision and decrease costs for its position detection.

As a technique of this kind, recited in Non-Patent Literature 2, for example, is related art which realizes highly precise tag position coordinate estimation in an active RFID system by referring to tags disposed densely in an environment.

On the other hand, recited in Patent Literature 1 is related art which realizes a position detection system at low costs by comparing a radio condition measured by a radio machine attached to a moving body and a radio condition measured by a radio machine for reference which is disposed in each area in advance.

Non-Patent Literature 1: G. Chen and D. Kotz, "A Survey of Context-Aware Mobile Computing Research", Technical Report 381, Department of Computer Science, Dartmouth College 2000.
Non-Patent Literature 2: Lionel M. Ni, Yunhao Liu, Yiu Cho Lau and Abhishek P. Patil, LANDMARC: Indoor Location Sensing Using Active RFID, PerCom 2003.
Non-Patent Literature 3: Kohonen, Self-Organizing Map, Schuplinger•Farelark Tokyo Co. Ltd., June 2005.
Patent Literature 1: Japanese Patent Laying-Open No. 2006-308361.

Problem of the position detection systems recited in the above-described Non-Patent Literature 1 and 2 and Patent Literature 1 and the like is incapability for correct detection of a position of a radio machine attached to a moving body when the number of radio machines for reference which are disposed in an environment is small.

The reason is that a difference between a radio condition measured by a radio machine for reference and a radio condition measured by a radio machine attached to a moving body becomes larger due to characteristics of radio environments derived from a dynamic hindrance in the environment or a manner of attachment of the radio machine to the moving body.

OBJECT OF THE INVENTION

An object of the present invention, which is embodied in view of the above-described problem, is to provide a position detection device, a position detection method and a position detection program which enable a position of a radio machine attached to a moving body to be precisely detected even when the number of radio machines for reference disposed in an environment is small.

SUMMARY

A position detection device which detects a position of a moving body in a predetermined environment according to a first exemplary aspect of the invention, includes a reception feature quantity generation unit which obtains, from a base station which is disposed in the environment and receives identification information transmitted by radio communication from a mobile station attached to the moving body and a reference station disposed in each area defined in advance in the environment, the identification information and a reception intensity of a radio wave as of the reception of the identification information to generate a reception feature quantity which correlates the reception intensity related to each of the mobile station and the reference station with the base station, a position reception feature quantity generation unit which generates a reception feature quantity of each area from the reception feature quantity related to the reference station taking into consideration a factor of a difference caused between reception feature quantities related to the mobile station and the reference station which are generated by the reception feature quantity generation unit, a position reception feature quantity learning unit which learns a reception feature quantity of each area generated by the position reception feature quantity generation unit and records the quantity into a position reception feature quantity storage unit together with position identification information, and a position determination unit which searches the position reception feature quantity storage unit for a reception feature quantity most proximate to the reception feature quantity related to the mobile station which is generated by the reception feature quantity generation unit and outputs corresponding position identification information as a position detection result.

A position detection device which detects a position of a moving body in a predetermined environment according to a second exemplary aspect of the invention, includes a reception feature quantity generation unit which, from a mobile station attached to the moving body and a reference station disposed in each area defined in advance in the environment, both of which stations receive identification information transmitted from a base station disposed in the environment by radio communication, obtains the identification information and a reception intensity of a radio wave as of the reception of the identification information to generate a reception feature quantity which correlates the reception intensity related to each of the mobile station and the reference station with the base station, a position reception feature quantity generation unit which generates a reception feature quantity of each area from the reception feature quantity related to the reference station taking into consideration a factor of a difference caused between reception feature quantities related to the mobile station and the reference station which are generated by the reception feature quantity generation unit, a position reception feature quantity learning unit which learns a reception feature quantity of each area generated by the position reception feature quantity generation unit and records the quantity into a position reception feature quantity storage unit together with position identification information, and a position determination unit which searches the position reception feature quantity storage unit for a reception feature quantity most proximate to the reception feature quantity related to the mobile station which is generated by the reception feature quantity generation unit and outputs corresponding position identification information as a position detection result.

A position detection method of detecting a position of a moving body in a predetermined environment according to a first exemplary aspect of the invention, includes a reception feature quantity generation step of obtaining, from a base station which is disposed in the environment and receives identification information transmitted by radio communication from a mobile station attached to the moving body and a reference station disposed in each area defined in advance in the environment, the identification information and a reception intensity of a radio wave as of the reception of the identification information to generate a reception feature quantity which correlates the reception intensity related to each of the mobile station and the reference station with the base station, a position reception feature quantity generation step of generating a reception feature quantity of each area from the reception feature quantity related to the reference station taking into consideration a factor of a difference caused between reception feature quantities related to the mobile station and the reference station which are generated at the reception feature quantity generation step, a step of learning a reception feature quantity of each area generated at the position reception feature quantity generation step and recording the quantity into a position reception feature quantity storage unit together with position identification information, and a position determination step of searching the position reception feature quantity storage unit for a reception feature quantity most proximate to the reception feature quantity related to the mobile station which is generated at the reception feature quantity generation step and outputting corresponding position identification information as a position detection result.

A position detection method of detecting a position of a moving body in a predetermined environment according to a second exemplary aspect of the invention, includes a reception feature quantity generation step of, from a mobile station attached to the moving body and a reference station disposed in each area defined in advance in the environment, both of which stations receive identification information transmitted from a base station disposed in the environment by radio communication, obtaining the identification information and a reception intensity of a radio wave as of the reception of the identification information to generate a reception feature quantity which correlates the reception intensity related to each of the mobile station and the reference station with the base station, a position reception feature quantity generation step of generating a reception feature quantity of each area from the reception feature quantity related to the reference station taking into consideration a factor of a difference caused between reception feature quantities related to the mobile station and the reference station which are generated at the reception feature quantity generation step, a step of learning a reception feature quantity of each area generated at the position reception feature quantity generation step and recording the quantity into a position reception feature quantity storage unit together with position identification information, and a position determination step of searching the position reception feature quantity storage unit for a reception feature quantity most proximate to the reception feature quantity related to the mobile station which is generated at the reception feature quantity generation step and outputting corresponding position identification information as a position detection result.

A position detection program which is executed on an information processing device for detecting a position of a moving body in a predetermined environment according to a first exemplary aspect of the invention, the program causing the information processing device to execute a reception feature quantity generation processing of, from a base station which is disposed in the environment and receives identification information transmitted by radio communication from a mobile station attached to the moving body and a reference station disposed in each area defined in advance in the environment, obtaining the identification information and a reception intensity of a radio wave as of the reception of the identification information to generate a reception feature quantity which correlates the reception intensity related to each of the mobile station and the reference station with the base station, a position reception feature quantity generation processing of generating a reception feature quantity of each area from the reception feature quantity related to the reference station taking into consideration a factor of a difference caused between reception feature quantities related to the mobile station and the reference station which are generated in the reception feature quantity generation processing, a processing of learning a reception feature quantity, of each area generated in the position reception feature quantity generation processing and recording the quantity into a position reception feature quantity storage unit together with position identification information, and a position determination processing of searching the position reception feature quantity storage unit for a reception feature quantity most proximate to the reception feature quantity related to the mobile station which is generated in the reception feature quantity generation processing and outputting corresponding position identification information as a position detection result.

A position detection program which is executed on an information processing device for detecting a position of a moving body in a predetermined environment according to a second exemplary aspect of the invention, the program causing the information processing device to execute a reception feature quantity generation processing of, from a mobile station attached to the moving body and a reference station disposed in each area defined in advance in the environment, both of which stations receive identification information transmitted from a base station disposed in the environment by radio communication, obtaining the identification information and a reception intensity of a radio wave as of the reception of the identification information to generate a reception feature quantity which correlates the reception intensity related to each of the mobile station and the reference station with the base station, a position reception feature quantity generation processing of generating a reception feature quantity of each area from the reception feature quantity related to the reference station taking into consideration a factor of a difference caused between reception feature quantities related to the mobile station and the reference station which are generated in the reception feature quantity generation processing, a processing of learning a reception feature quantity of each area generated in the position reception feature quantity generation processing and recording the quantity into a position reception feature quantity storage unit together with position identification information, and a position determination processing of searching the position reception feature quantity storage unit for a reception feature quantity most proximate to the reception feature quantity related to the mobile station which is generated in the reception feature quantity generation processing and outputting corresponding position identification information as a position detection result.

The present invention allows a position detection system using radio communication to precisely detect a position of a mobile station attached to a moving body even with a small number of reference stations.

BRIEF DESCRIPTION OF THE DRAWINGS

FIG. 3 is a diagram showing an example of a reception feature quantity according to the first exemplary embodiment of the present invention;

FIG. 4 is a block diagram showing a structure of a position reception feature quantity generation unit of the position detection device according to the first exemplary embodiment of the present invention;

FIG. 5 is a diagram showing an example of information recorded in a position reception feature quantity storage unit of the position detection device according to the first exemplary embodiment of the present invention;

FIG. 6 is a time chart showing operation according to the first exemplary embodiment of the present invention;

FIG. 7 is a time chart showing operation according to the first exemplary embodiment of the present invention;

FIG. 8 is a time chart showing operation according to the first exemplary embodiment of the present invention;

EXEMPLARY EMBODIMENT

First Exemplary Embodiment

Next, a first exemplary embodiment of the present invention will be detailed with reference to the drawings.

Figure 1:
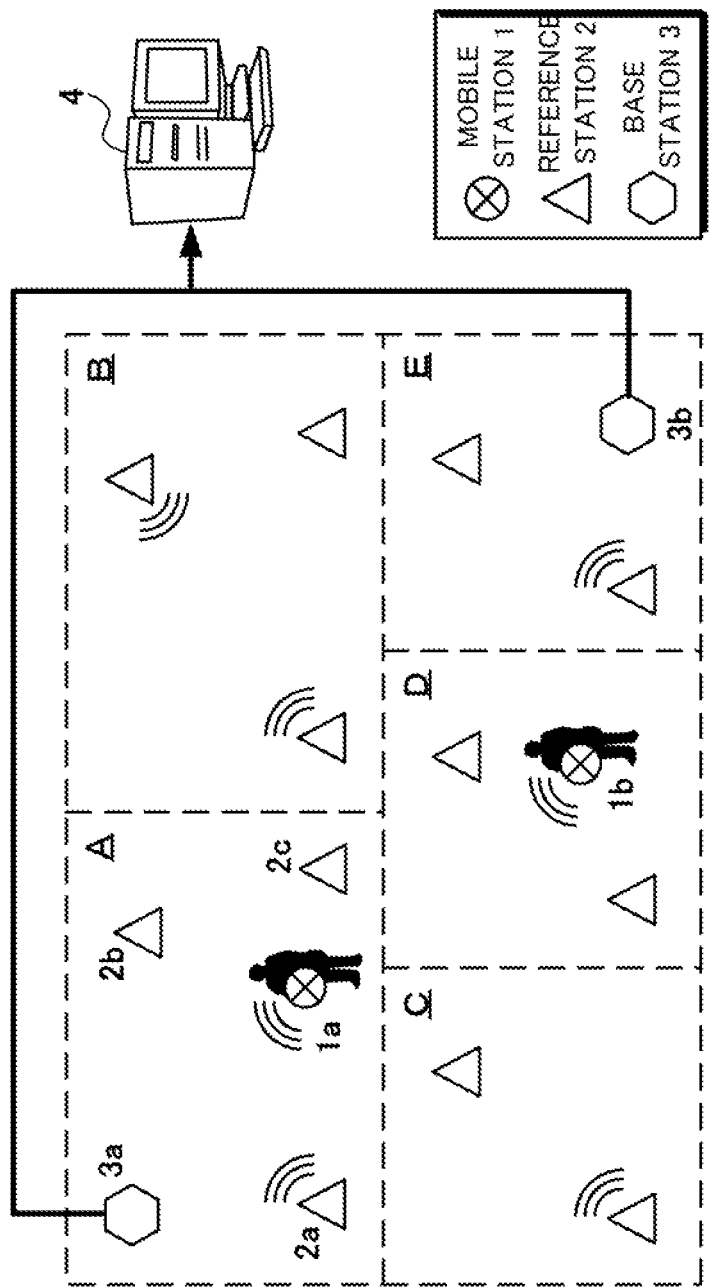
FIG. 1 is a diagram showing outlines of a system according to a first exemplary embodiment of the present invention.
Figure 2:
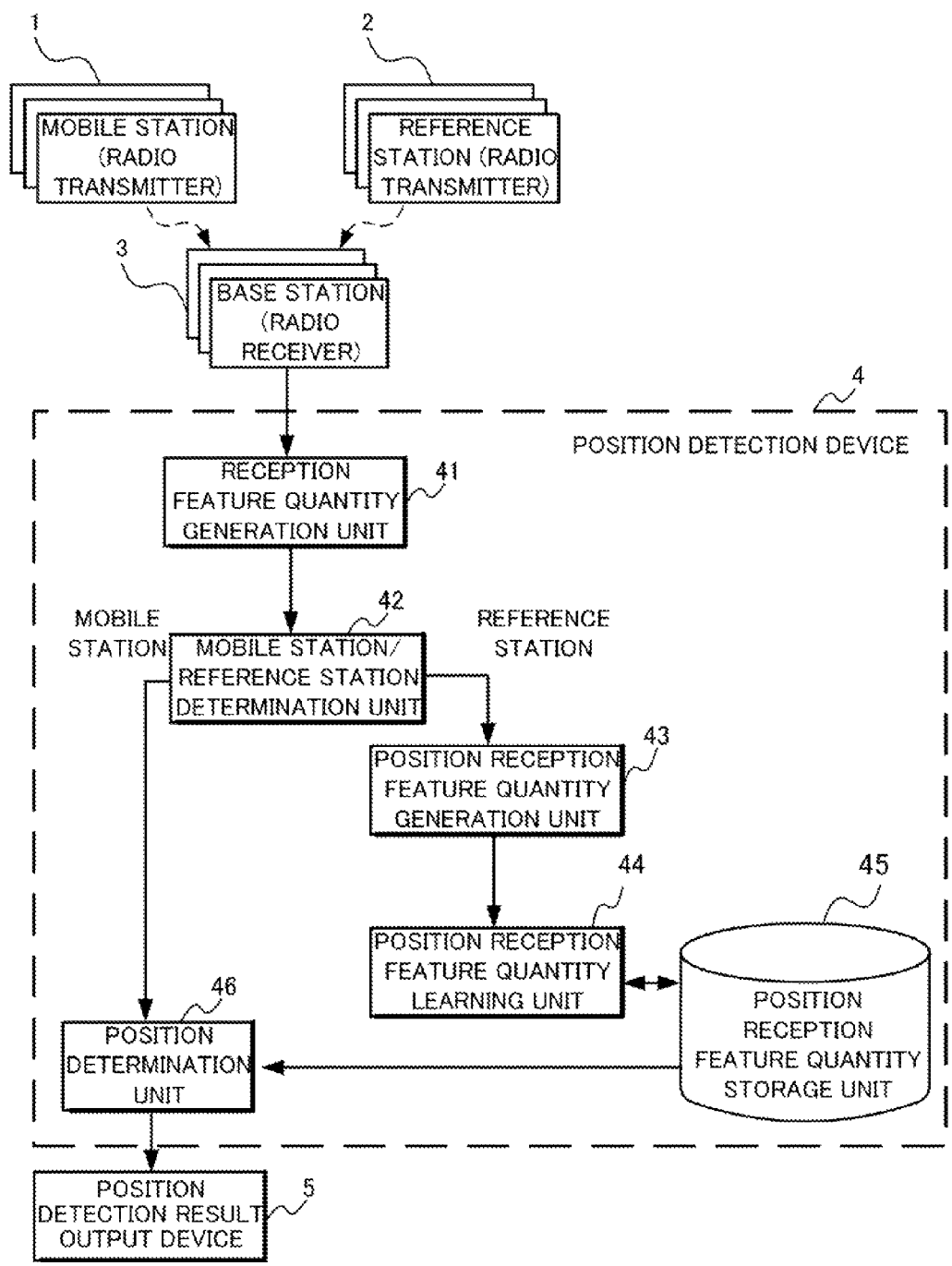
FIG. 2 is a block diagram showing a structure of a position detection device according to the first exemplary embodiment of the present invention.

With reference to FIG. 1 and FIG. 2, a position detection system according to the first exemplary embodiment of the present invention comprises mobile stations $1a$, $1b$ . . . attached to such a target to be sensed as a moving body for transmitting identification information for identifying a device at fixed time intervals by radio communication, reference stations $2a$, $2b$ . . . disposed in an environment so as to correspond with an area defined in advance for transmitting identification information for identifying a device at fixed time intervals by radio communication, base stations $3a$, $3b$ . . . disposed in an environment for receiving identification information transmitted by the mobile stations $1a$, $1b$ . . . and the reference stations $2a$, $2b$ . . . by radio communication, a position detection device 4 for detecting an area where each of the mobile stations $1a$, $1b$ . . . locates by using a reception result of the mobile stations $1a$, $1b$ . . . and the reference stations $2a$, $2b$ . . . which is obtained at the base stations $3a$, $3b$ . . . , and a position detection result output device 5 for outputting a position detection result.

The base stations $3a$, $3b$ . . . receive identification information transmitted by the mobile stations $1a$, $1b$ . . . and the reference stations $2a$, $2b$ . . . , as well as measuring a numerical value indicative of an intensity of radio wave as of reception of each identification information (hereinafter referred to as a reception intensity). The base stations $3a$, $3b$ . . . also output a pair of obtained identification information and reception intensity of the mobile station or the reference station to the position detection device 4 as a reception result together with identification information of the base station.

The reference stations $2a$, $2b$ . . . need be disposed at least one in each area defined in advance. The base stations $3a$, $3b$ . . . need not always be plural but be single.

Furthermore, it is not always necessary for the mobile stations $1a$, $1b$ . . . and the reference stations $2a$, $2b$ . . . to transmit identification information at fixed time intervals and it is also possible to dynamically change a time interval at which identification information is transmitted according, for example, to a time zone or a traveling speed of a moving body and also possible to transmit identification information only upon reception of an instruction from a user as a moving body or the position detection device.

The position detection device 4, as shown in FIG. 2, comprises a reception feature quantity generation unit 41, a mobile station/reference station determination unit 42, a position reception feature quantity generation unit 43, a position reception feature quantity learning unit 44, a position reception feature quantity storage unit 45 and a position determination unit 46.

The reception feature quantity generation unit 41 generates a reception feature quantity for each of the mobile stations $1a$, $1b$ . . . and the reference stations $2a$, $2b$ . . . from reception results of the mobile stations $1a$, $1b$ . . . and the reference stations $2a$, $2b$ . . . which are obtained from the base stations $3a$, $3b$ . . . and outputs the same together with the corresponding identification information.

Reception feature quantity is represented by a feature vector whose component is a reception intensity of each of all the base stations $3a$, $3b$ . . . . Reception feature quantity will be, for example, 165 for the base station $3a$, 0 for the base station $3b$, 204 for the base station $3c$ and 129 for the base station $3d$ as shown in FIG. 3.

The mobile station/reference station determination unit 42 determines whether a reception feature quantity generated by the reception feature quantity generation unit 41 relates to a mobile station or to a reference station based on the corresponding identification information and outputs the reception feature quantities related to the mobile stations $1a$, $1b$ . . . to the position determination unit 46 and the reception feature quantities related to the reference stations $2a$, $2b$ . . . to the position reception feature quantity generation unit 43.

At this time, for determining whether a reception feature quantity relates to the mobile station or the reference station from the corresponding identification information, such information as enables direct determination whether it relates to the mobile station or the reference station may be incorporated into the identification information or with such information recorded in a data base or the like in advance as enables determination whether each identification information relates to the mobile station or the reference station, determination may be made whether it relates to the mobile station or the reference station by referring to the information in the data base.

As shown in FIG. 4, the position reception feature quantity generation unit 43, which comprises a position reception feature quantity correlating unit 431 and a position reception feature quantity error factor reflecting unit 432, generates a reception feature quantity of each area from the reception quantities related to the reference stations 2a, 2b . . . applied by the mobile station/reference station determination unit 42.

The position reception feature quantity correlating unit 431 generates a reception feature quantity of each area from the reception feature quantity of each of the reference stations 2a, 2b . . . and outputs the same.

At this time, for obtaining areas where the reference stations 2a, 2b . . . locate from the corresponding identification information, information related to an area where the reference station is disposed may be incorporated into the identification information or with information recorded in a data base or the like in advance which is related to an area where the reference station corresponding to each identification information is disposed, areas of the reference stations 2a, 2b . . . may be determined by referring to the information in the data base.

On the other hand, when a plurality of reference stations are disposed in a certain area, a linear sum of reception feature quantities obtained related to the plurality of reference stations disposed in the area may be used as a reception feature quantity of the area. More specifically, with reception feature quantities (feature vectors) obtained related to a number n of reference stations disposed in a certain area as $v_1, v_2, \ldots v_n$, a reception feature quantity v' of the area can be obtained as follows.

$$v' = \sum_{k=1}^{n} \alpha_k v_k \quad \text{(NUMERICAL EXPRESSION 1)}$$

$\alpha_1, \alpha_2, \ldots, \alpha_n$ are assumed to be random values which can be arbitrarily selected so as to satisfy the following conditions.

$$\sum_{k=1}^{n} \alpha_k = 1 \quad \text{(NUMERICAL EXPRESSION 2)}$$

When a plurality of reference stations are disposed in a certain area, setting $\alpha_1, \alpha_2, \ldots, \alpha_n$ as a combination of arbitrary numbers to generate a reception feature quantity v' of the area enables generation of a larger number of reception feature quantities v' than the number of the reference stations disposed. This leads to mitigation of a difference between reception feature quantities caused by a difference between a reference station disposition position and a mobile station existing position even when the number of reference stations disposed in the area is small.

Furthermore, also when only a single reference station is disposed in a certain area, for the later processing at the position reception feature quantity error factor reflecting unit 432, a reception feature quantity obtained related to the single reference station may be copied to output a plurality of reception feature quantities as a reception feature quantity related to the area.

The position reception feature quantity error factor reflecting unit 432 modifies and outputs the obtained reception feature quantity of each area while taking into consideration a difference in a reception intensity measured related to each of the reference stations 2a, 2b . . . and the mobile stations 1a, 1b . . . .

Among specific examples of modification given by the position reception feature quantity error factor reflecting unit 432 is modification of a reception feature quantity taking into consideration a change of a reception intensity caused by directivity of a transmission antenna of a mobile station. In a case, for example, where used with a mobile station attached to a person or an object, an intensity of a radio wave transmitted varies with a direction due to effects such as shielding by the person or the object to which the station is attached. At this time, it is necessary to reflect, on a reception feature quantity of each area, the fact that a reception intensity obtained related to the mobile stations 1a, 1b . . . changes with respect to a reception intensity obtained related to the reference stations 2a, 2b . . . due to a change in directivity of a transmission antenna.

For example, among directions obtained by dividing omni-direction by m which are measured in advance, with a change of an intensity of a radio wave transmitted to an i-th direction which is selected at random (an amount of change from a transmitted radio wave intensity measured at a single mobile station to a transmitted radio wave intensity measured in the attachment to a person or an object, whose unit is the same as that of a reception intensity) represented as $P_i$, a reception intensity $v_j''$ as a j-th element of an output reception feature quantity v'' can be obtained as follows from a reception intensity $v_j'$ as a j-th element of the input reception feature quantity v'.

$$v_j'' = v_j' + P_i$$

By changing all the elements of the reception feature quantities by each amount of change in a reception intensity selected at random, a reception intensity change caused by directivity of a transmission antenna of the mobile station can be reflected on a reception feature quantity of each area.

Among other specific examples of modification given by the position reception feature quantity error factor reflecting unit 432 is modification of a reception feature quantity taking into consideration a reception intensity measurement error of the base stations 3a, 3b . . . .

In a case, for example, where reception intensity measurement by the base stations 3a, 3b . . . includes an error according to a normal distribution having a certain variance, with an error of a reception intensity obtained at random according to an error probability distribution assumed to be ε, the reception intensity $v_j''$ as the j-th element of the output reception feature quantity v'' can be obtained as follows from the reception intensity $v_j'$ as the j-th element of the input reception feature quantity v'.

$$v_j'' = v_j' + \epsilon$$

By changing each of all the elements of the reception feature quantities by a reception intensity measurement error selected at random according to an error probability distribution, a reception intensity change due to a reception intensity measurement error of the base station can be reflected on a reception feature quantity of each area.

Among other specific examples of modification given by the position reception feature quantity error factor reflecting unit 432 is modification of a reception feature quantity taking into consideration characteristics of a communication protocol for use in radio communication.

In an ALOHA system widely used as a communication protocol in an active RFID system, for example, each radio transmitter executes communication at random timing. At this time, when signals transmitted from a plurality of radio transmitters simultaneously come into a radio receiver, signal collision occurs to prevent normal communication. Probability of occurrence of such signal collision can be calculated by a communication time necessary for one communication of each radio transmitter, the number of communication per unit time of each radio transmitter and the number of radio transmitters within the reach of a signal at a radio receiver.

Therefore, according to an occurrence probability of signal collision obtained according to characteristics of a communication protocol for use, by changing the reception intensity $v_j''$ as the j-th element of the output reception feature quantity $v''$ to "0" (no signal is received), characteristics of the communication protocol for use in radio communication can be reflected on a reception feature quantity of each area.

The position reception feature quantity learning unit 44 learns a reception feature quantity of each area generated by the position reception feature quantity generation unit 43 including tendencies of the past and records the same in the position reception feature quantity storage unit 45.

FIG. 5 shows one example of contents stored in the position reception feature quantity storage unit 45. As shown in FIG. 5, stored in the position reception feature quantity storage unit 45 is at least one reception feature quantity on an area basis together with position identification information for identifying the area.

Thus learning and recording a reception feature quantity of each area including tendencies of the past enables mitigation of a difference between reception feature quantities obtained with respect to the mobile stations 1a, 1b . . . and the reference stations 2a, 2b . . . respectively, which difference is caused by an effect of a dynamic hindrance in the environment.

Among specific examples of learning by the position reception feature quantity learning unit 44 is recording all the position feature quantities of the respective areas into the position reception feature quantity recording unit 45. At this time, reception feature quantities recorded prior to a fixed time point designated may be deleted from the position reception feature quantity recording unit 45.

Among other specific examples of learning by the position reception feature quantity learning unit 44 is learning a plurality of position feature quantities each representing each area by self-organizing map or learning vector quantization, with an applied position feature quantity of each area as teacher data (Non-Patent Literature 3: Kohonen, Self-Organizing Map, Schuplinger•Farelark Tokyo Co. Ltd., June 2005).

The position determination unit 46 searches the reception feature quantities recorded in the position reception feature quantity storage unit 45 for a reception feature quantity most proximate to a reception feature quantity related to the mobile stations 1a, 1b . . . obtained from the mobile station/reference station determination unit 42 and outputs position identification information recorded in the position reception feature quantity storage unit 45 so as to be correlated with the searched most proximate reception feature quantity as a position determination result.

Here, proximity between two reception feature quantities is obtained by using a method of calculating an Euclidean distance between feature vectors and evaluating that the smaller the Euclidean distance becomes, the closer they are. In place of an Euclidean distance, a city block distance can be used.

Next, with reference to FIGS. 2, 6, 7 and 8, detailed description will be made of operation of the position detection system according to the first exemplary embodiment of the present invention. FIGS. 6, 7 and 8 are time charts for use in explaining operation in the present exemplary embodiment.

The base stations 3a, 3b . . . receive identification information transmitted by the mobile stations 1a, 1b . . . and the reference stations 2a, 2b . . . (Step A1 in FIG. 6) to output a pair of the received identification information of the mobile stations 1a, 1b . . . or the reference stations 2a, 2b . . . and a reception intensity to the reception feature quantity generation unit 41 of the position detection device 4 together with the identification information of the base station as a reception result (Step A2 in FIG. 6).

The reception feature quantity generation unit 41 of the position detection device 4 accumulates the reception results of the mobile stations 1a, 1b . . . and the reference stations 2a, 2b . . . obtained from the base stations 3a, 3b . . . for a fixed time period, generates a reception feature quantity of each of the mobile stations 1a, 1b . . . and the reference stations 2a, 2b . . . from the accumulated reception results and outputs the generated quantity to the mobile station/reference station determination unit 42 together with the corresponding identification information (Step A3 in FIG. 6).

Among the obtained reception feature quantities, the mobile station/reference station determination unit 42 outputs a reception feature quantity determined to be related with the reference stations 2a, 2b . . . to the position reception feature quantity generation unit 43 together with the corresponding identification information (Step B1 in FIG. 7).

The position reception feature quantity generation unit 43 generates a reception feature quality of each area from the reception feature quality obtained from each of the reference stations 2a, 2b . . . and outputs the same to the position reception feature quantity learning unit 44 (Step B2 in FIG. 7).

The position reception feature quantity learning unit 44 records the obtained reception feature quantity of each area into the position reception feature quantity storage unit 45 or updates the reception feature quantity recorded in the position reception feature quantity storage unit 45 based on the obtained reception feature quantity of each area (Step B3 in FIG. 7).

The mobile station/reference station determination unit 42 outputs, out of the obtained reception feature quantities, a reception feature quantity determined to be related to the mobile stations 1a, 1b . . . to the position determination unit 46 together with the corresponding identification information (Step C1 in FIG. 8).

With respect to each of the reception feature quantities obtained related to the respective mobile stations, the position determination unit 46 searches for a most proximate reception quantity among those recorded in the position reception feature quantity storage unit 45 (Step C2 in FIG. 8) to obtain position identification information recorded corresponding to the searched most proximate reception feature quantity (Step C3 in FIG. 8).

Output the position identification information obtained with respect to each mobile station as a position detection result of each mobile station (Step C4 in FIG. 8).

Effects of the First Exemplary Embodiment

By modifying a reception feature quantity obtained with respect to a reference station while taking factors into consideration such as a difference between a reference station disposition position and a mobile station position, directivity of a transmission antenna, a reception intensity measurement error and a communication protocol, and then learning and recoding the obtained result including tendencies of the past, even when the number of reference stations is small, a difference between a recorded reception feature quantity of each area and a reception feature quantity obtained with respect to a mobile station can be mitigated to precisely detect a position of the mobile station.

Second Exemplary Embodiment

Next, a second exemplary embodiment of the present invention will be detailed with reference to the drawings.

Figure 9:
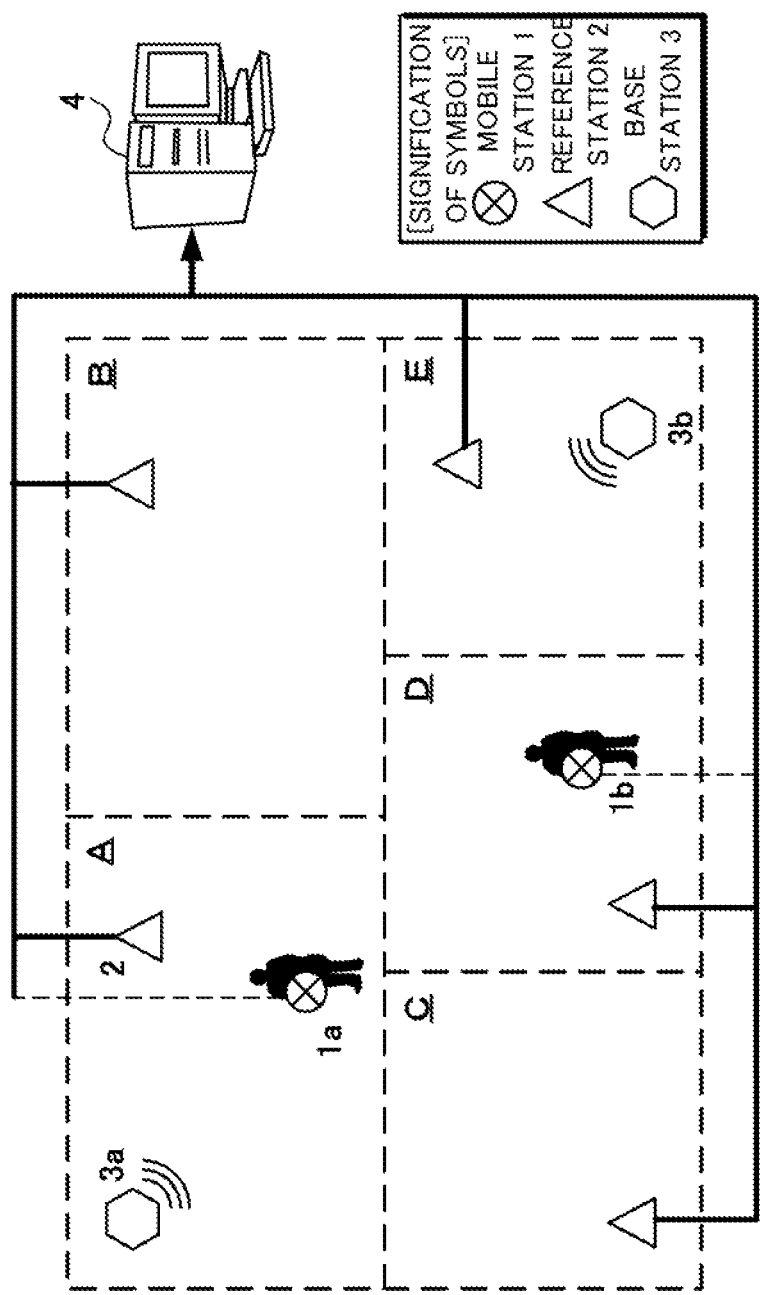
FIG. 9 is a diagram showing outlines of a system according to a second exemplary embodiment of the present invention.
Figure 10:
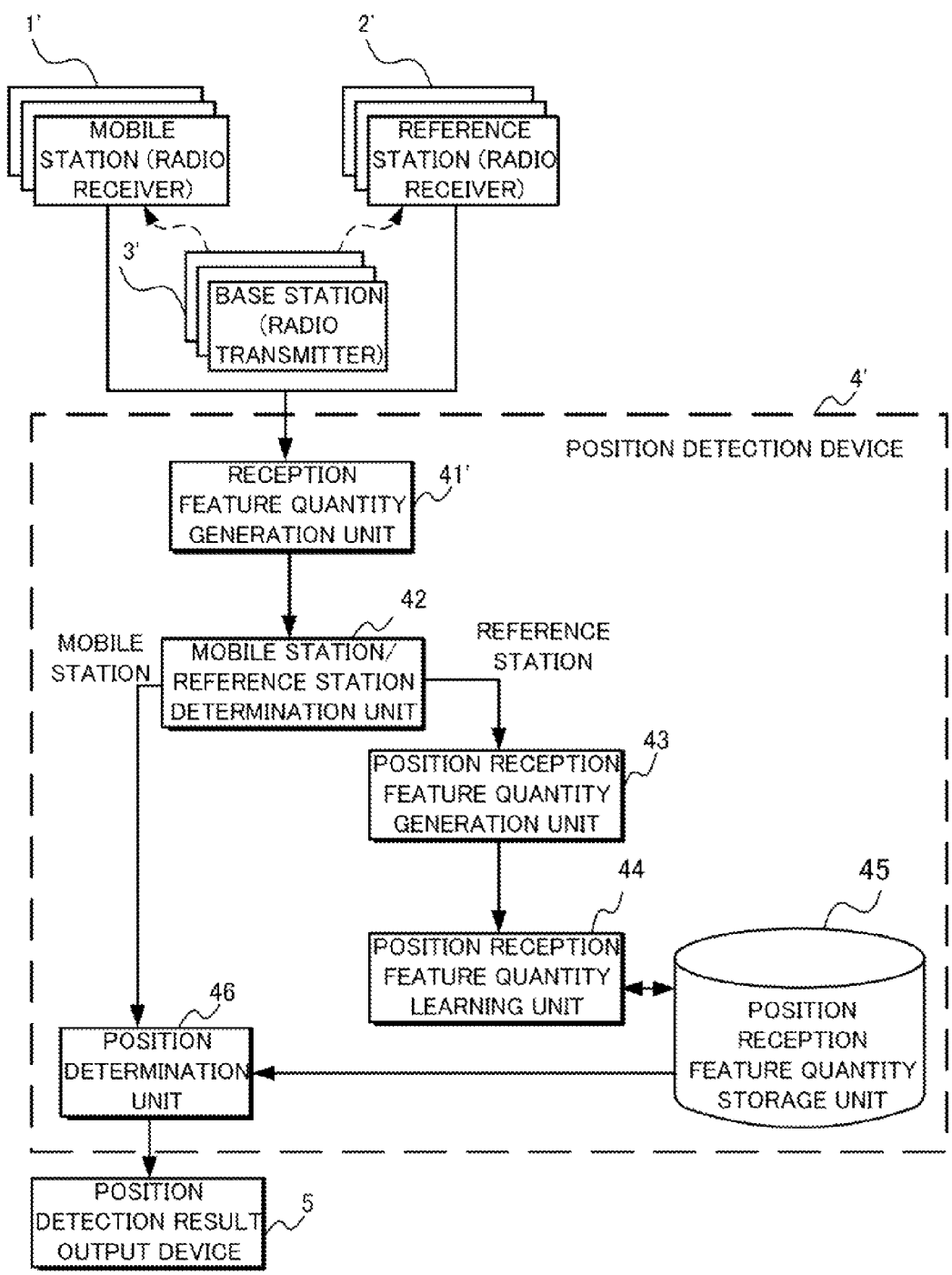
FIG. 10 is a block diagram showing a structure of a position detection device according to the second exemplary embodiment of the present invention.

With reference to FIG. 9 and FIG. 10, a position detection system according to the second exemplary embodiment of the present invention differs from the first exemplary embodiment of the present invention shown in FIG. 1 and FIG. 2 in that it comprises base stations $3a'$, $3b'$ . . . disposed in an environment for transmitting identification information for identifying a device at fixed time intervals by radio communication in place of the base stations $3a$, $3b$ . . . as a radio receiver, mobile stations $1a'$, $1b'$ . . . attached to such a target to be sensed as a moving body for receiving identification information transmitted by the base stations $3a'$, $3b'$ by radio communication in place of the mobile stations $1a$, $1b$ . . . as a radio transmitter, and reference stations $2a'$, $2b'$ . . . disposed in an environment so as to correspond with an area defined in advance for receiving the identification information transmitted by the base stations $3a'$, $3b'$ . . . by radio communication in place of the reference stations $2a'$, $2b'$ . . . as a radio transmitter.

Another difference is that a position detection device 4' comprises, in place of the reception feature quantity generation unit 41 of the position detection device 4 for a moving body in the first exemplary embodiment shown in FIG. 2, a reception feature quantity generation unit 41' which generates a reception feature quantity for each of the reference stations $2a'$, $2b'$ . . . and the mobile stations $1a'$, $1b'$ . . . based on reception results of identification information from the base stations $3a'$, $3b'$ . . . which information is received at the mobile stations $1a'$, $1b'$ . . . and reception results of identification signals from the base stations $3a'$, $3b'$ . . . which signals are received at the reference stations $2a'$, $2b'$ . . . and outputs the same together with its corresponding identification information.

The mobile stations $1a'$, $1b'$ . . . and the reference stations $2a'$, $2b'$ . . . measure a reception intensity, as well as receiving identification information transmitted by the base stations $3a'$, $3b'$ . . . . A pair of the obtained identification information and reception intensity of the base station is output together with identification information of the mobile station or the reference station as a reception result to the reception feature quantity generation unit 41'.

The reference stations $2a'$, $2b'$ . . . should be disposed at least one in each area defined in an environment. The base stations $3a'$, $3b'$ . . . need not always be disposed in the plural but be single.

Furthermore, the base stations $3a'$, $3b'$ . . . need not always transmit identification information at fixed time intervals, and a time interval for transmitting identification information may be dynamically changed according to a time zone or a moving body traveling speed, for example, or identification information may be transmitted only when receiving an instruction from a user as a moving body or the position detection device.

Figure 11:
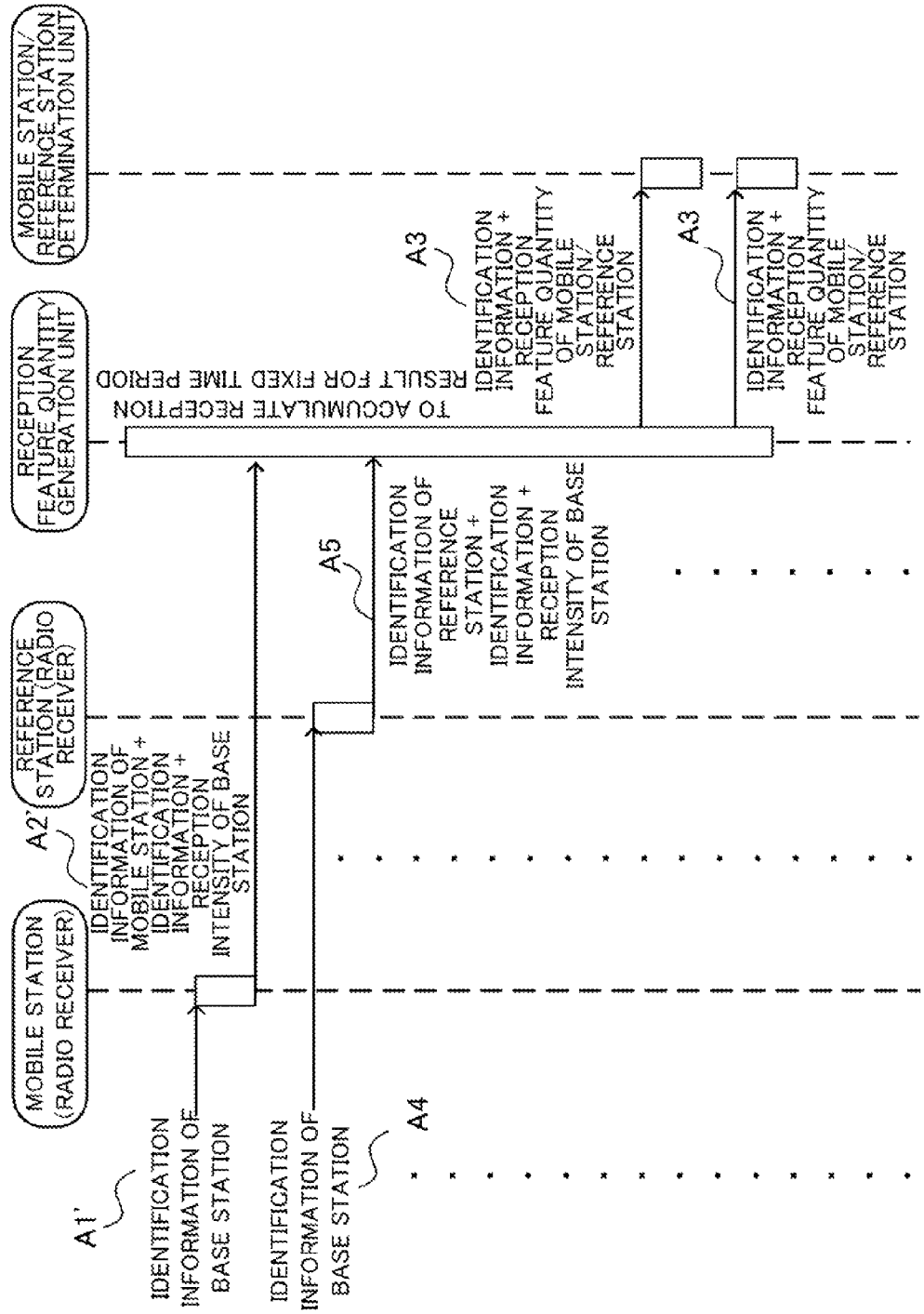
FIG. 11 is a time chart showing operation according to the second exemplary embodiment of the present invention.

Operation of the second exemplary embodiment of the present invention will be detailed with reference to FIG. 10 and FIG. 11. FIG. 11 is a time chart for use in explaining the operation according to the present exemplary embodiment.

Since operation of the mobile station/reference station determination unit 42, the position reception feature quantity generation unit 43, the position reception feature quantity learning unit 44, the position reception feature quantity storage unit 45, the position determination unit 46 and the position detection result output device 5 according to the second exemplary embodiment of the present invention is the same as the operation of the mobile station/reference station determination unit 42, the position reception feature quantity generation unit 43, the position reception feature quantity learning unit 44, the position reception feature quantity storage unit 45, the position determination unit 46 and the position detection result output device 5 according to the first exemplary embodiment, no description will be made thereof.

The mobile stations $1a'$, $1b'$ . . . and the reference stations $2a'$, $2b'$ . . . receive identification information transmitted by the base stations $3a'$, $3b'$ . . . (Steps A1' and A4' in FIG. 11) to output a pair of the received identification information and a reception intensity of the base station to the reception feature quantity generation unit 41' together with the identification information of the mobile station or the reference station (Step A2' and A5' in FIG. 11).

The reception feature quantity generation unit 41' accumulates the reception results of the base stations $3a'$, $3b'$ . . . obtained from the mobile stations $1a'$, $1b'$ . . . and the reference stations $2a'$, $2b'$ . . . for a fixed time period, generates a reception feature quantity of each of the mobile stations $1a'$, $1b'$ . . . and the reference stations $2a'$, $2b'$ . . . from the accumulated reception results and outputs the generated quantity to the mobile station/reference station determination unit 42 together with the corresponding identification information (Step A3 in FIG. 11).

Since operation to follow of the mobile station/reference station determination unit 42, the position reception feature quantity generation unit 43, the position reception feature quantity learning unit 44, the position determination unit 46 and the position detection result output device 5 is the same as that of the firth exemplary embodiment shown in FIG. 7 and FIG. 8.

Effects of the Second Exemplary Embodiment

Next, effects of the second exemplary embodiment of the present invention will be described.

According to the second exemplary embodiment, even when the number of radio receivers for reference disposed in an environment is small, by modifying a reception feature quantity obtained with respect to a reference station while taking factors into consideration such as a difference between a reference station disposition position and a mobile station position, directivity of a reception antenna, a reception intensity measurement error and a communication protocol, and then learning and recoding the obtained result including tendencies of the past, a difference between a recorded reception feature quantity of each area and a reception feature quantity obtained with respect to a mobile station can be mitigated to precisely detect a position of the mobile station.

Third Exemplary Embodiment

Next, a third exemplary embodiment of the present invention will be detailed with reference to the drawings.

Figure 12:
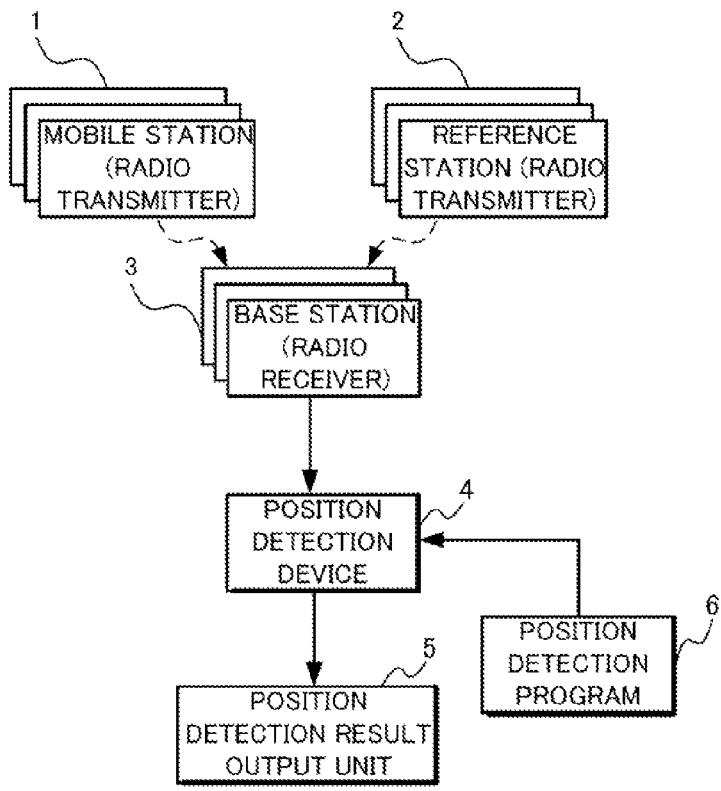
FIG. 12 is a block diagram showing a system structure according to a third exemplary embodiment of the present invention.

With reference to FIG. 12, the third exemplary embodiment of the present invention comprises, similarly to the first exemplary embodiment of the present invention, a mobile station 1 attached to such a target to be sensed as a moving body for transmitting identification information for identifying a device at fixed time intervals by radio communication, a reference station 2 disposed in an environment so as to correspond with an area defined in advance for transmitting identification information for identifying a device at fixed time intervals by radio communication, a base station 3 disposed in an environment for receiving identification information transmitted by the mobile station 1 and the reference station 2 by radio communication, the position detection device 4 for detecting an area where the mobile station 1 locates by using a reception result of the mobile station 1 and the reference station 2 which result is obtained at the base station 3, and the position detection result output device 5 for outputting a position detection result.

A position detection program 6 is read into the position detection device 4 to control operation of the position detection device 4. The position detection device 4 executes the same processing as the processing by the position detection device 4 according to the first exemplary embodiment of the present invention under the control of the position detection program 6.

Fourth Exemplary Embodiment

Next, a fourth exemplary embodiment of the present invention will be detailed with reference to the drawings.

Figure 13:
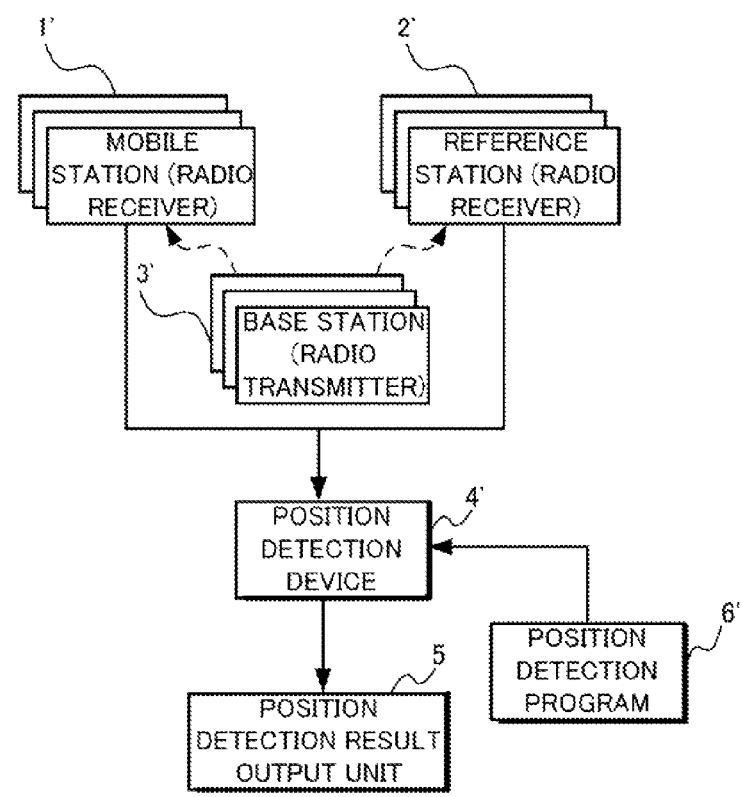
FIG. 13 is a block diagram showing a system structure according to a fourth exemplary embodiment of the present invention.

With reference to FIG. 13, the fourth exemplary embodiment of the present invention comprises, similarly to the second exemplary embodiment of the present invention, a base station 3' disposed in an environment for transmitting identification information for identifying a device at fixed time intervals by radio communication, a mobile station 1' attached to such a target to be sensed as a moving body for receiving identification information transmitted by the base station 3' by radio communication, a reference station 2' disposed in an environment so as to correspond with an area defined in advance for receiving the identification information transmitted by the base station 3' by radio communication, the position detection device 4' for detecting an area where the mobile station 1' locates by using a reception result of the base station 3' obtained at the mobile station 1' and the reference station 2', and the position detection result output device 5 for outputting a position detection result.

A position detection program 6' is read into the position detection device 4' to control operation of the position detection device 4'. The position detection device 4' executes the same processing as the processing by the position detection device 4' according to the second exemplary embodiment of the present invention under the control of the position detection program 6'.

MODES OF IMPLEMENTATION

Next, a first mode of implementation of the present invention will be described. This mode of implementation corresponds to the first exemplary embodiment of the present invention.

The present mode of implementation comprises, as the mobile stations 1*a*, 1*b* . . . and the reference stations 2*a*, 2*b* . . . , an active RFID tag which transmits identification information (inherent ID) to be held using a button battery as a power source at fixed time intervals (e.g. 0.5 sec.) by radio communication. As the base stations 3*a*, 3*b* . . . , it further comprises an RFID reader which receives identification information from the RFID tag, as well as measuring a reception intensity (256 stages of integral values from 0 to 255).

The position detection device 4, which is realized by a personal computer, uses a display as the position detection result output device 5. The personal computer has a central processing device functioning as the reception feature quantity generation unit 41, the mobile station/reference station determination unit 42, the position reception feature quantity generation unit 43, the position reception feature quantity learning unit 44 and the position determination unit 46, and a storage device functioning as the position reception feature quantity storage unit 45.

In the present mode of implementation, even when the number of tags for reference disposed in an environment is small, by modifying a reception feature quantity obtained with respect to a tag for reference while taking factors into consideration such as a difference between a reference tag disposition position and a moving body tag position, directivity of a transmission antenna of a tag, a reception intensity measurement error of a reader and signal collision due to an ALOHA communication protocol, and then learning and recoding the obtained result including tendencies of the past by using an active RFID system, a difference between a recorded reception feature quantity of each area and a reception feature quantity obtained with respect to a moving body tag can be mitigated to precisely detect a position of the moving body tag.

Next, a second mode of implementation of the present invention will be described. This mode of implementation corresponds to the second exemplary embodiment of the present invention.

The present mode of implementation comprises, as the base stations 3*a'*, 3*b'* . . . , a radio LAN access point which transmits its own identification information (MAC address) as a beacon packet (informative packet) at fixed time intervals (e.g. 0.1 sec.). As the mobile stations 1*a'*, 1*b'* . . . and the reference stations 2*a'*, 2*b'* . . . , it further comprises a radio LAN device which receives a beacon packet including identification information from the radio LAN access point, as well as measuring a reception intensity (on a dBm basis) to transmit the obtained identification information and reception intensity to the position detection device 4' through a radio LAN communication path.

The position detection device 4', which is realized by a personal computer, uses a display as the position detection result output device 5. The personal computer has a central processing device functioning as the reception feature quantity generation unit 41', the mobile station/reference station determination unit 42, the position reception feature quantity generation unit 43, the position reception feature quantity learning unit 44 and the position determination unit 46, and a storage device functioning as the position reception feature quantity storage unit 45.

In the present mode of implementation, even when the number of radio LAN devices for reference disposed in an environment is small, by modifying a reception feature quantity obtained with respect to a radio LAN device for reference while taking factors into consideration such as a difference between a reference radio LAN device disposition position and a moving body radio LAN device position, directivity of a reception antenna of the radio LAN device, a reception intensity measurement error of the radio LAN device and signal collision due to a communication protocol of a MAC layer for use in radio LAN (802.11b/g etc.), and then learning and recording the obtained result including tendencies of the past by using a radio LAN system, a difference between a recorded reception feature quantity of each area and a reception feature quantity obtained with respect to a moving body radio LAN device can be mitigated to precisely detect a position of the moving body radio LAN device.

Although the present invention has been described with respect to the preferred exemplary embodiments and modes of implementation in the foregoing, the present invention is not necessarily limited to the above-described exemplary embodiments and modes of implementation and can be implemented in various modifications without departing from the scope of their technical ideas.

INCORPORATION BY REFERENCE

This application is the National Phase of PCT/JP2009/051190, filed Jan. 26, 2009, which is based upon and claims the benefit of priority from Japanese patent application No. 2008-021623, filed on Jan. 31, 2008, the disclosure of which is incorporated herein in its entirety by reference.

INDUSTRIAL APPLICABILITY

According to the present invention, position acquisition of a person or an object by making use of a position detection system by radio communication is applicable to such use as for a program for realizing, in a computer, a system of high precision and low costs by using a radio machine for reference disposed in an environment.

What is claimed is:

1. A position detection device which detects a position of a moving body in a predetermined environment, comprising:
a reception feature quantity generation unit which obtains, from a base station which is disposed in said predetermined environment and receives identification information for identifying a mobile station and a reference station transmitted by radio communication from a mobile station attached to said moving body and a reference station disposed in each area defined in advance in said predetermined environment, said identification information and a reception intensity indicative of an intensity of radio wave as of the reception of said identification information to generate a reception feature quantity represented by a feature vector whose component is said reception intensity which correlates said reception intensity related to each of said mobile station and said reference station with said base station;
a position reception feature quantity generation unit which generates a reception feature quantity of each area from the reception feature quantity related to said reference station taking into consideration a difference between reception feature quantities related to said mobile station and said reference station which are generated by said reception feature quantity generation unit;
a position reception feature quantity learning unit which learns a reception feature quantity of each area generated by said position reception feature quantity generation unit and records the quantity into a position reception feature quantity storage unit together with position identification information set up in advance for identifying the area; and
a position determination unit which searches said position reception feature quantity storage unit for a reception feature quantity most proximate to the reception feature quantity related to the mobile station which is generated by said reception feature quantity generation unit and outputs corresponding position identification information as a position detection result.

2. The position detection device according to claim 1, wherein said position reception feature quantity generation unit calculates a linear sum based on a random weight of a reception feature quantity obtained related to said reference station of each said area as a reception feature quantity of each area.

3. The position detection device according to claim 1, wherein said position reception feature quantity generation unit modifies a reception feature quantity of each area based on directivity of a transmission/reception antenna set up in advance.

4. The position detection device according to claim 1, wherein said position reception feature quantity generation unit modifies a reception feature quantity of each area based on a reception intensity measurement error occurrence probability distribution set up in advance.

5. The position detection device according to claim 1, wherein said position reception feature quantity generation unit modifies a reception feature quantity of each area based on a signal collision occurrence probability set up in advance.

6. A position detection method of detecting a position of a moving body in a predetermined environment, comprising:
a reception feature quantity generation step of obtaining, from a base station which is disposed in said predetermined environment and receives identification information for identifying a mobile station and a reference station transmitted by radio communication from a mobile station attached to said moving body and a reference station disposed in each area defined in advance in said predetermined environment, said identification information and a reception intensity indicative of an intensity of radio wave as of the reception of said identification information to generate a reception feature quantity represented by a feature vector whose component is said reception intensity which correlates said reception intensity related to each of said mobile station and said reference station with said base station;
a position reception feature quantity generation step of generating a reception feature quantity of each area from the reception feature quantity related to said reference station taking into consideration a difference between reception feature quantities related to said mobile station and said reference station which are generated at said reception feature quantity generation step;
a step of learning a reception feature quantity of each area generated at said position reception feature quantity generation step and recording the quantity into a position reception feature quantity storage unit together with position identification information set up in advance for identifying the area; and
a position determination step of searching said position reception feature quantity storage unit for a reception feature quantity most proximate to the reception feature quantity related to the mobile station which is generated at said reception feature quantity generation step and outputting corresponding position identification information as a position detection result.

7. The position detection method according to claim 6, wherein at said position reception feature quantity generation step, a linear sum based on a random weight of a reception feature quantity obtained related to said reference station of said area is calculated as a reception feature quantity of each area.

8. The position detection method according to claim 6, wherein at said position reception feature quantity generation step, a reception feature quantity of each area is modified based on directivity of a transmission/reception antenna set up in advance.

9. The position detection method according to claim 6, wherein at said position reception feature quantity generation step, a reception feature quantity of each area is modified based on a reception intensity measurement error occurrence probability distribution set up in advance.

10. The position detection method according to claim 6, wherein at said position reception feature quantity generation step, a reception feature quantity of each area is modified based on a signal collision occurrence probability set up in advance.

11. A computer readable medium storing a position detection program which is executed on an information processing device for detecting a position of a moving body in a predetermined environment, said program causing said information processing device to execute:

a reception feature quantity generation processing of, from a base station which is disposed in said predetermined environment and receives identification information for identifying a mobile station and a reference station transmitted by radio communication from a mobile station attached to said moving body and a reference station disposed in each area defined in advance in said predetermined environment, obtaining said identification information and a reception intensity indicative of an intensity of radio wave as of the reception of said identification information to generate a reception feature quantity represented by a feature vector whose component is said reception intensity which correlates said reception intensity related to each of said mobile station and said reference station with said base station;

a position reception feature quantity generation processing of generating a reception feature quantity of each area from the reception feature quantity related to said reference station taking into consideration a difference between reception feature quantities related to said mobile station and said reference station which are generated in said reception feature quantity generation processing;

a processing of learning a reception feature quantity of each area generated in said position reception feature quantity generation processing and recording the quantity into a position reception feature quantity storage unit together with position identification information set up in advance for identifying the area; and a position determination processing of searching said position reception feature quantity storage unit for a reception feature quantity most proximate to the reception feature quantity related to the mobile station which is generated in said reception feature quantity generation processing and outputting corresponding position identification information as a position detection result.

12. The computer readable medium according to claim 11, wherein in said position reception feature quantity generation processing, a linear sum based on a random weight of a reception feature quantity obtained related to said reference station of each area is calculated as a reception feature quantity of each area.

13. The computer readable medium according to claim 11, wherein in said position reception feature quantity generation processing, a reception feature quantity of each area is modified based on directivity of a transmission/reception antenna set up in advance.

14. The computer readable medium according to claim 11, wherein in said position reception feature quantity generation processing, a reception feature quantity of each area is modified based on a reception intensity measurement error occurrence probability distribution set up in advance.

15. The computer readable medium according to claim 11, wherein in said position reception feature quantity generation processing, a reception feature quantity of each area is modified based on a signal collision occurrence probability set up in advance.

* * * * *